(12) United States Patent
Algazi et al.

(10) Patent No.: US 8,499,165 B2
(45) Date of Patent: *Jul. 30, 2013

(54) SYSTEM AND METHOD FOR BIOMETRIC VERIFICATION IN A DELIVERY PROCESS

(75) Inventors: Allan Stuart Algazi, Succasunna, NJ (US); Salvatore Anthony Sparacino, Smithtown, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1509 days.

This patent is subject to a terminal disclaimer.

(21) Appl. No.: 11/366,864

(22) Filed: Mar. 1, 2006

(65) Prior Publication Data

US 2006/0156029 A1    Jul. 13, 2006

Related U.S. Application Data

(63) Continuation of application No. 10/283,405, filed on Oct. 29, 2002, now Pat. No. 7,039,813.

(51) Int. Cl.
*G06F 21/00* (2013.01)

(52) U.S. Cl.
USPC ............................ 713/185; 713/182; 713/166

(58) Field of Classification Search
None
See application file for complete search history.

(56) References Cited

U.S. PATENT DOCUMENTS

| | | | |
|---|---|---|---|
| 5,420,924 | A | 5/1995 | Berson et al. |
| 5,767,496 | A | 6/1998 | Swartz et al. |
| 5,790,674 | A | 8/1998 | Houvener et al. |
| 5,815,252 | A | 9/1998 | Price-Francis |
| 5,825,871 | A | 10/1998 | Mark |
| 5,872,848 | A | 2/1999 | Romney et al. |
| 5,917,913 | A | 6/1999 | Wang |

(Continued)

FOREIGN PATENT DOCUMENTS

| | | |
|---|---|---|
| JP | 2001-297269 A | 10/2001 |
| JP | 2000-282190 A | 3/2002 |

(Continued)

OTHER PUBLICATIONS

First Office Action for Japanese Application Serial No. 2004-548475 mailed Apr. 14, 2009, a foreign counterpart of U.S. Appl. No. 11/366,864, which is a continuation of US Patent No. 7,039,813.

(Continued)

*Primary Examiner* — Pramila Parthasarathy

(57) ABSTRACT

Described is a method and system for providing a verified delivery of a package. First, registration information is obtained from a recipient; the registration information includes a biometric identification of the recipient. A delivery service obtains the package from a sender which is addressed to the recipient and forwards the package to the recipient. At the point of delivery, the delivery service obtains a further biometric identification from the recipient using a portable device which includes a biometric reader. The delivery service releases the package to the recipient only if the biometric identification is substantially identical to the further biometric identification.

12 Claims, 7 Drawing Sheets

U.S. PATENT DOCUMENTS

| | | | |
|---|---|---|---|
| 5,974,147 | A | 10/1999 | Cordery et al. |
| 6,018,739 | A | 1/2000 | McCoy et al. |
| 6,092,192 | A | 7/2000 | Kanevsky et al. |
| 6,140,939 | A | 10/2000 | Flick |
| 6,307,956 | B1 | 10/2001 | Black |
| 6,549,892 | B1 | 4/2003 | Sansone |
| 6,690,997 | B2 * | 2/2004 | Rivalto ........................ 700/237 |
| 6,751,734 | B1 | 6/2004 | Uchida |
| 6,819,219 | B1 | 11/2004 | Bolle et al. |
| 7,039,813 | B2 | 5/2006 | Algazi et al. |
| 7,058,685 | B1 * | 6/2006 | van Zee et al. ................ 709/206 |
| 7,343,299 | B2 | 3/2008 | Algazi |
| 7,386,456 | B2 | 6/2008 | Algazi |
| 2001/0032096 | A1 * | 10/2001 | Uchida ............................ 705/1 |
| 2002/0060243 | A1 | 5/2002 | Janiak |
| 2002/0089410 | A1 | 7/2002 | Janiak |
| 2002/0091537 | A1 | 7/2002 | Algazi et al. |
| 2002/0103653 | A1 | 8/2002 | Huxter |
| 2002/0138742 | A1 | 9/2002 | Hamid et al. |
| 2002/0156645 | A1 | 10/2002 | Hansen |
| 2003/0050732 | A1 | 3/2003 | Rivalto |
| 2003/0084305 | A1 | 5/2003 | Siegel et al. |
| 2003/0159052 | A1 | 8/2003 | Lee |
| 2003/0225592 | A1 | 12/2003 | Algazi et al. |
| 2004/0044627 | A1 * | 3/2004 | Russell et al. .................. 705/50 |
| 2004/0162984 | A1 * | 8/2004 | Freeman et al. .............. 713/175 |

FOREIGN PATENT DOCUMENTS

| | | |
|---|---|---|
| JP | 2002-092553 A | 3/2002 |
| JP | 2002-109409 A | 4/2002 |
| JP | 2002-205823 A | 7/2002 |
| JP | 2002-288605 A | 10/2002 |

OTHER PUBLICATIONS

Applicants English translation of First Office Action for Japanese Application Serial No. 2004-548475 mailed Apr. 14, 2009, a foreign counterpart of U.S. Appl. No. 11/366,864, which is a continuation of US Patent No. 7,039,813.

First Office Action for Chinese Application Serial No. 200380102522.2 mailed Apr. 3, 2009, a foreign counterpart of U.S. Appl. No. 11/366,864.

Applicant's English translation of First Office Action for Chinese Application Serial No. 200380102522.2 mailed Apr. 3, 2009, a foreign counterpart of U.S. Appl. No. 11/366,864.

English language translation of Notice of Allowance mailed on Nov. 4, 2009 in counterpart Japanese Patent Application No. 2004-548475.

International Search Report for counterpart International Application No. PCT/US2003/33856 mailed on Apr. 9, 2004.

Supplementary European Search Report for counterpart European Application No. 03 77 9256, European Patent Office, The Hague, Netherlands, mailed on Nov. 6, 2007.

US Office Action dated Jul. 28, 2005 relating to parent application U.S. Patent No. 7039813, issued May 2, 2006.

Final Rejection dated Mar. 25, 2005 relating to parent application U.S. Patent No. 7039813, issued May 2, 2006.

Office Action dated Mar. 5, 2004 relating to parent application U.S. Patent No. 7039813, issued May 2, 2006.

Notice of Allowance and Fees Due dated Dec. 1, 2005 relating to parent application U.S. Patent No. 7039813, issued Mar. 2, 2006.

* cited by examiner

SYSTEM AND METHOD FOR BIOMETRIC VERIFICATION IN A DELIVERY PROCESS

PRIORITY CLAIM

The present application is a Continuation application of U.S. patent application Ser. No. 10/283,405 filed Oct. 29, 2002 now U.S. Pat. No. 7,039,813, "System and Method for Biometric Verification in a Delivery Process", the entire disclosure of which is expressly incorporated herein by reference.

FIELD OF THE INVENTION

The present invention relates to a system and method for verification of a recipient's identity by a delivery service (e.g., United States Postal Service [USPS], United Parcel Service [UPS], Federal Express [FedEx], etc.) by using an individual's biometric identifiers (e.g., fingerprint, voice, retina, etc.)

BACKGROUND

Delivery services have been requiring for many decades recipients to sign for packages or parcels in order to insure that the intended person received the shipment. With the advent of new technology, the pen-and-paper method of recording the recipient's identity has become obsolete. Presently, many of the delivery services record the signature electronically and store that signature in a central database which may be accessed later by the sender (e.g., through a website) for verification purposes. However, this system of verification still relies on capturing only the signature of the recipient and does not verify his identity in any other way.

There are a number of problems that arise when such conventional systems are utilized in secure deliveries. For example, the secure deliveries may be packages that contain precious (e.g., gems, bonds, secure documents, etc.) or dangerous items (e.g., chemical and biological agents) which are directed to a very specific recipient (e.g., "diamond district" of New York City, brokerage houses, law firms, laboratories, etc.). The mere recording of the recipient's signature may be insufficient in these situations because it cannot verify if the intended recipient in fact received the package. Sometimes the recipient may have a designated representative who is authorized to receive and sign for the packages. However, when the authorized representative is absent another individual may simply sign for the authorized representative, and thus gaining the access to the contents of the package.

SUMMARY OF THE INVENTION

The present invention relates to a method and system for providing a verified delivery of a package. First, registration information is obtained from a recipient; the registration information includes a biometric identification of the recipient. A delivery service obtains the package from a sender which is addressed to the recipient and forwards the package to the recipient.

At the point of delivery, the delivery service obtains a further biometric identification from the recipient using a portable device which includes a biometric reader. The delivery service releases the package to the recipient only if the biometric identification is substantially identical to the further biometric identification.

BRIEF DESCRIPTION OF THE DRAWINGS

The accompanying drawings are included to provide a further understanding of the invention and are incorporated in and constitute part of the specification, illustrate several embodiments of the invention and, together with the description, serve to explain examples of the present invention. In the drawings.

DETAILED DESCRIPTION

The present invention is directed at a system and method for a biometric verification of a recipient's identity upon delivery of the shipment by a delivery service.

Figure 1A:
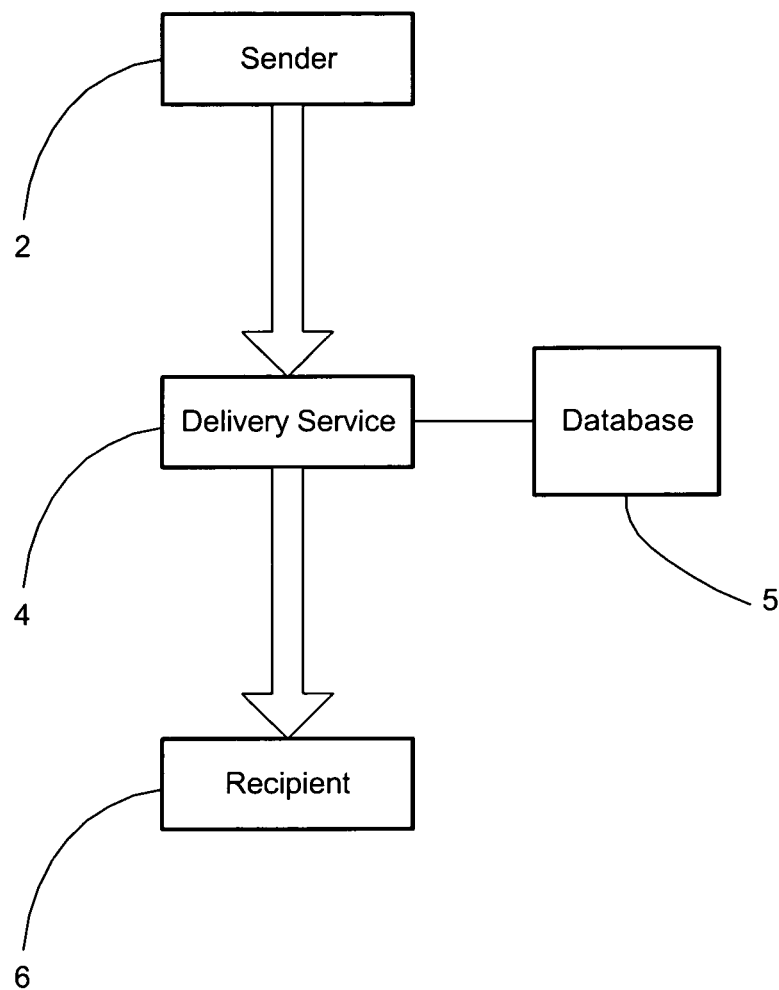
FIG. 1a shows an exemplary system for providing a verified delivery of a package according to the present invention.

FIG. 1a shows an exemplary flow of a package from a sender 2 to a recipient 6 using a delivery service 4. The sender 2 may be a particular entity that needs to ship, e.g., precious or dangerous merchandise. First, the sender 2 prepares the merchandise for shipment by placing it in a package and attaching a special label. The label may notify the delivery service 4 that the package must only be delivered to the designated recipient 6. In addition, the sender 2 may specify which representatives of the recipient 6 are authorized to receive the package. The information pertaining to the authorized representatives is stored by the delivery service 4 in a database 5. The database 5 may be used by the delivery service 4 to store the biometric identifiers of the authorized representatives of the recipient 6.

The sender 2 then forwards the package to the delivery service 4 (e.g., the sender 2 either drops off the package at a specified location or the delivery service 4 picks up the package directly from the sender 2). The sender 2 may also insure the contents of the package or request a return receipt in order to confirm the delivery, e.g., using certified mail, electronic delivery confirmation.

The delivery service 4 may be any local, nationwide or worldwide parcel or mail services (e.g., UPS, USPS, etc.). The delivery service 4 is notified (e.g., via the special packaging or the label) that the package may be delivered only to the authorized representatives. Upon obtaining the package from the sender 2, the delivery service 4 inputs the identities of the authorized representatives into the database 5. The package then travels through the distribution network of the delivery service 4 to a local branch office near which the recipient 6 is located. Once the package reached the recipient's 6 local branch office, the delivery service 4 will attempt to deliver the package.

Figure 2:
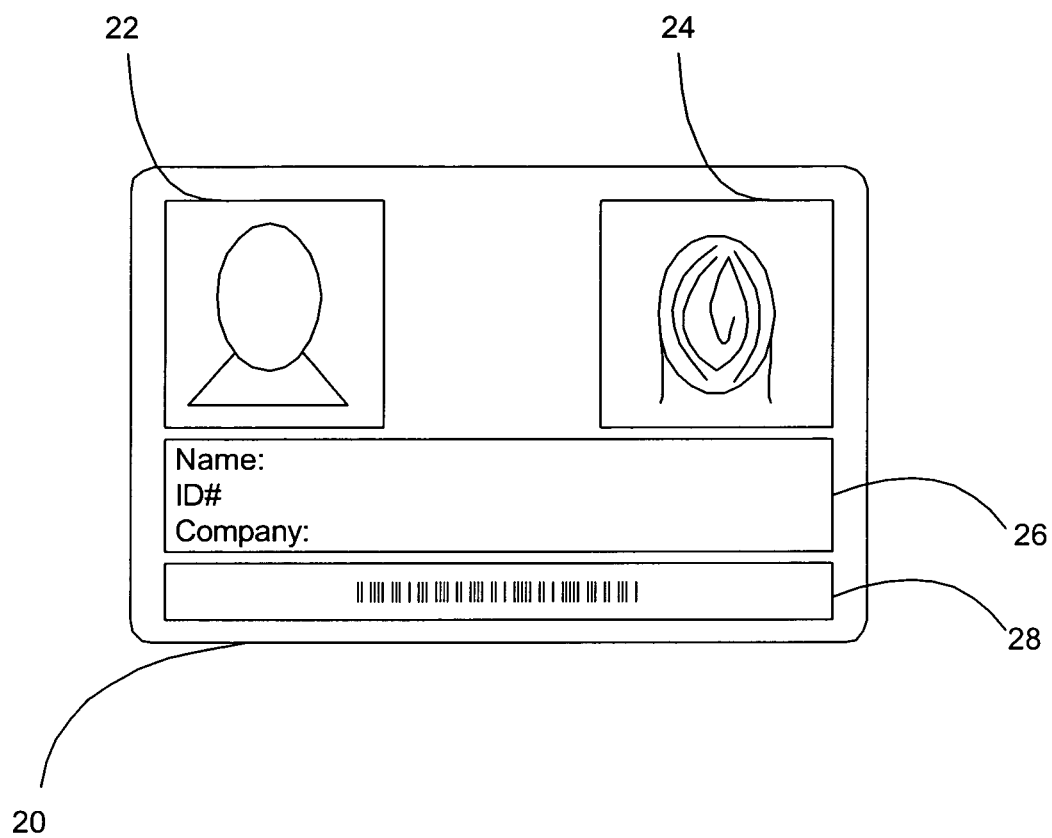
FIG. 2 shows a schematic diagram of an exemplary embodiment of an identification card according to the present invention.

As mentioned above, the recipient 6 may be any entity that regularly receives packages that contain precious or dangerous items. The recipient 6 may designate representatives who are authorized to receive the packages. The authorized representative are registered with the delivery service 4. In particular, biometric identification data of the authorized representative is obtained and stored in the database 5. Based on such data, a card 20 shown in FIG. 2 may be obtained. Upon registering the authorized representatives, the recipient 6 is ready to receive the packages using the system of biometric verification according to the present invention.

Figure 5:
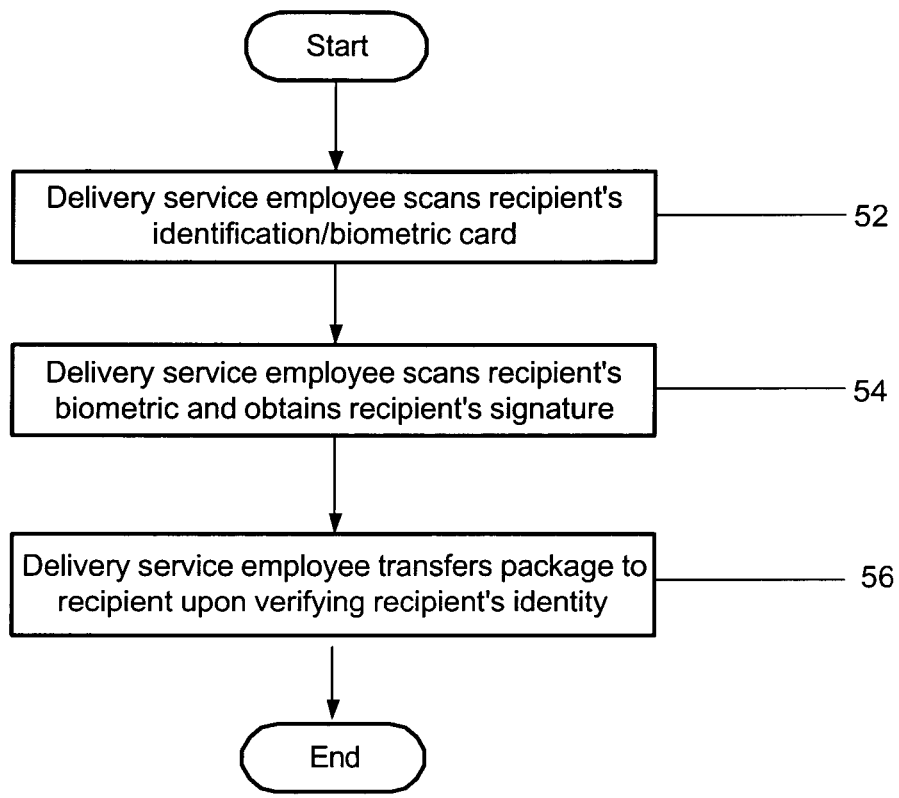
FIG. 5 shows a flow chart illustrating an exemplary embodiment of a method for verifying the recipient's identity using the identification card according to the present invention.

During delivery of the package, the delivery service 4 may obtain the signature of the authorized representative and the corresponding biometric identifier for the verification purposes using a scanning device 30 (shown in FIG. 3) and the card 20. This process is shown in FIG. 5 and is described in more detail below. The identity of the authorized representative is verified by comparing the biometric identifier obtained using the scanning device 30 to the biometric identifier stored in the database 5. If the biometric identifiers match then the delivery service 4 may release the package into possession of the authorized representative.

Figure 4:
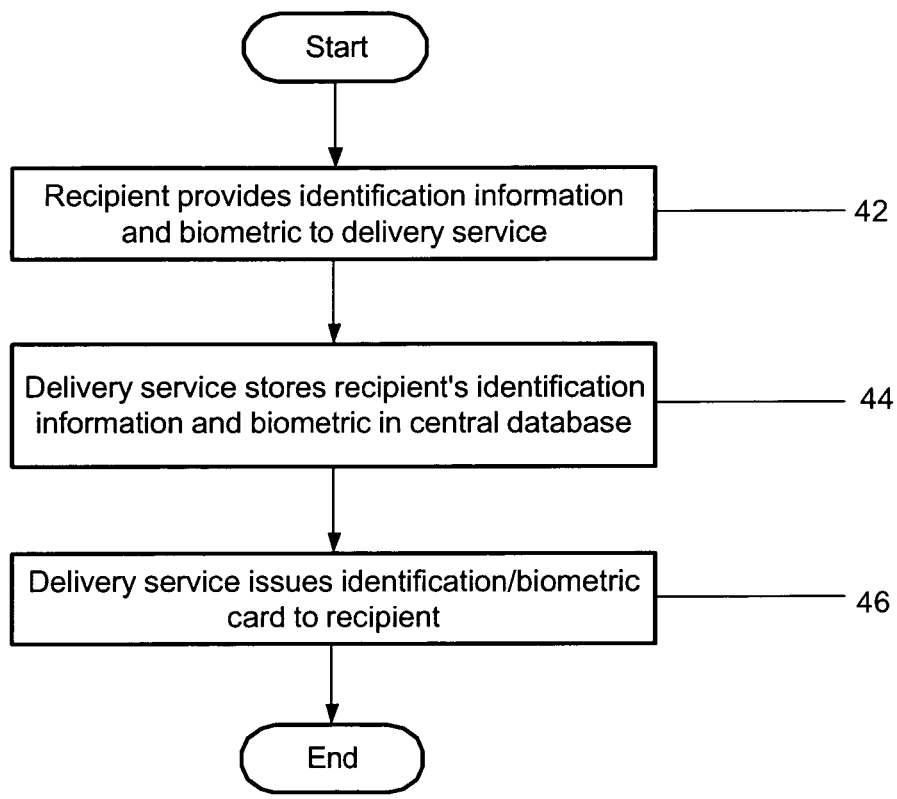
FIG. 4 shows a flow chart illustrating an exemplary embodiment of a method for the recipient to register with the delivery service according to the present invention.

The exemplary card 20 which contains data on individual authorized representative may be issued by the delivery service 4. This exemplary process is shown in FIG. 4 and is described in more detail below. The card 20 may serve as an additional layer of security, since the authorized representative has to show the card to the delivery service 4 in order to obtain the package.

The card 20 may consist of the authorized representative's photograph 22, a biometric identifier 24, identification information 26 (e.g., name, address, company, etc.), and a barcode 28. The barcode 28 may be a two-dimensional barcode which stores the above-identified information. The biometric identifier in this embodiment is a fingerprint 24. The present invention may also utilize any other biometric identifier such as, a retina scan, a voice recording, DNA, etc. Such biometric identifiers are more complex than a fingerprint and, as the result, they may require additional digital storage space than a fingerprint identifier. Therefore, a system which utilizes fingerprints as the biometric identifier may be easier to implement and it may be more cost-efficient. The biometric data and other information may also be stored on a computer chip which may be embedded into the card 20 and may be read by the scanning device 30.

The components of the card 20 may be located anywhere on the card 20. The photograph 22, the fingerprint 24, and the information 26 appearing on the card 20 are supplied by the recipient 6 and may be independently verified by the delivery service 4 prior to the issuance of the card 20. The barcode 28 allows the delivery service 4 to communicate with the card 20 and to extract the corresponding information.

Figure 3:
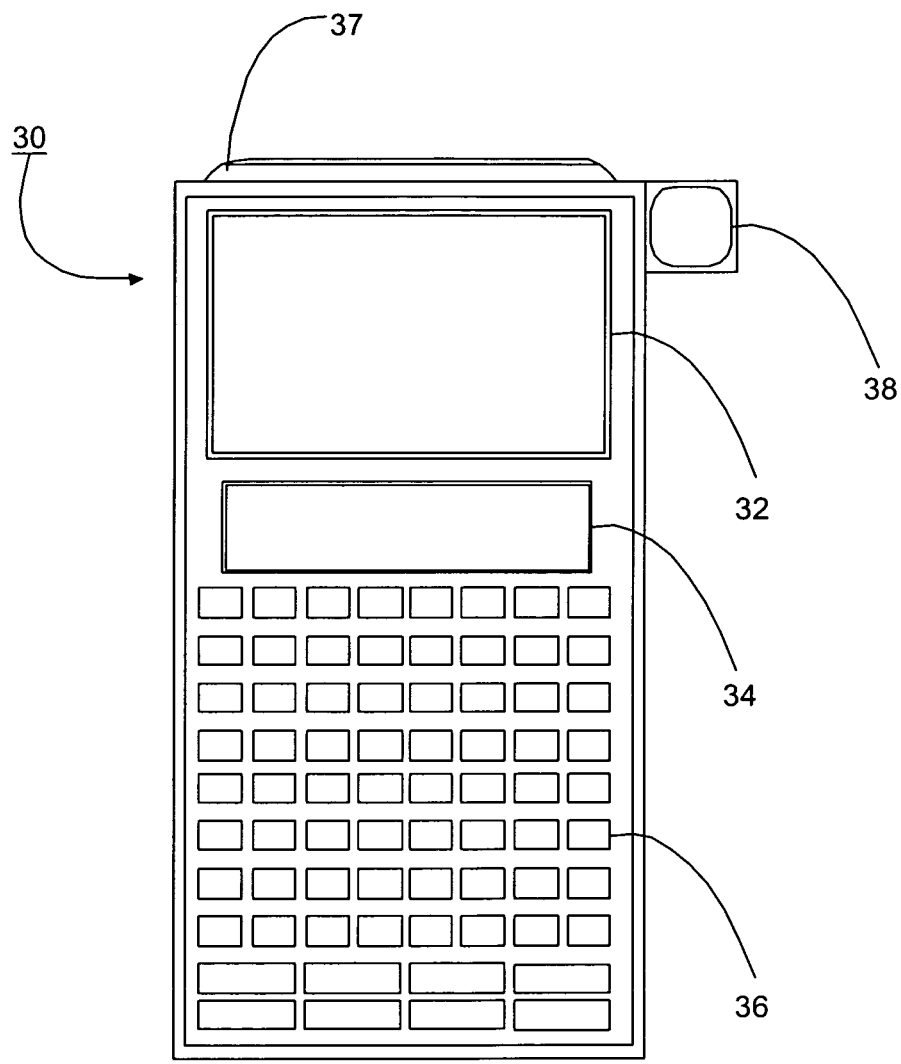
FIG. 3 shows a schematic diagram of an exemplary embodiment of a scanning device according to the present invention.

FIG. 3 shows the scanning device 30 which may include a display screen 32, a pointer pad 34, an input device (e.g., a keyboard 36), a barcode scanner 37 and a biometric scanner (e.g., a fingerprint reader 38). The scanning device 30 is used by the delivery service 4 during the delivery of the package to verify the identity of the authorized representatives and to record the delivery transaction. The device 30 may have a direct access (e.g., a wireless access) to the database 5 which allows it to extract necessary information from the database 5. In an alternative exemplary embodiment of the present invention, the necessary information may be downloaded to the scanning device 30 before the delivery attempt of the package to the recipient is made.

To verify the receipt of the package, the device 30 captures the authorized representative's signature using the pad 34. The device 30 scans the barcode 28 located on the card 20 using the scanner 37 to obtain the biometric identifier. Then, the device 30 reads the fingerprint 24 of the authorized representative using the reader 38. Subsequently, the device 30 compares the data obtained from the card 20 and the reader 38 to the biometric identifier stored in the database 5.

FIG. 4 shows an exemplary method for registering the authorized representative with the delivery service 4. In step 42, the recipient 6 provides the delivery service 4 with the authorized representative's photograph 22, the fingerprint 24, and the information 26. The delivery service 4 may independently verify that this data is correct by performing a background check. The delivery service 4 may also verify the photograph 22 and the fingerprint 24 when the authorized representative receives the card 20.

In step 44, the data (e.g., the fingerprint 24, the information 26, etc.) collected by the delivery service 4 is stored in the database 5. By storing the data in the database 5, the delivery service 4 may prevent unauthorized individuals from abusing the system (e.g., attempting to register as a recipient's representative 6). The delivery service 4 may be able to prevent fraud by, e.g., removing entries of those individuals who lost their card 20 or who are no longer employed by the recipient 6.

In step 46, the delivery service 4 generates the card 20 and issues the card 20 to the recipient 6. The card 20 may be delivered to the recipient 6. The authorized representatives may have to personally pick up the card 20. After the step 46, the recipient 6 is ready to receive secured packages.

FIG. 5 shows an exemplary method for verifying the identity of the recipient 6 or its authorized representative. In step 52, the authorized representative presents the card 20 to an employee of the delivery service 4 ("EDS"). After verifying that the card 20 belongs to the authorized representative (e.g., by verifying the photograph 22), the EDS scans the barcode 28 using the scanner 37. The device 30 obtains data about the authorized representative from the card 20 and uses that data to communicate with the database 5. The device 30 contacts the database 5 to determine first, if the cardholder is in fact the authorized representative of the eligible recipients 6. If the cardholder is authorized to receive the package, then the device 30 communicates with the database 5 to obtain the corresponding biometric identifier.

In step 54, the delivery service 4 scans the fingerprint of the cardholder using the reader 38. In step 56, the device 30 compares the fingerprint 24 obtained using the reader 38 in step 54 to the fingerprint 24 obtained from the database 5 in step 52. If the two fingerprints match, then the cardholder is an authorized representative who may receive the package.

Figure 6:
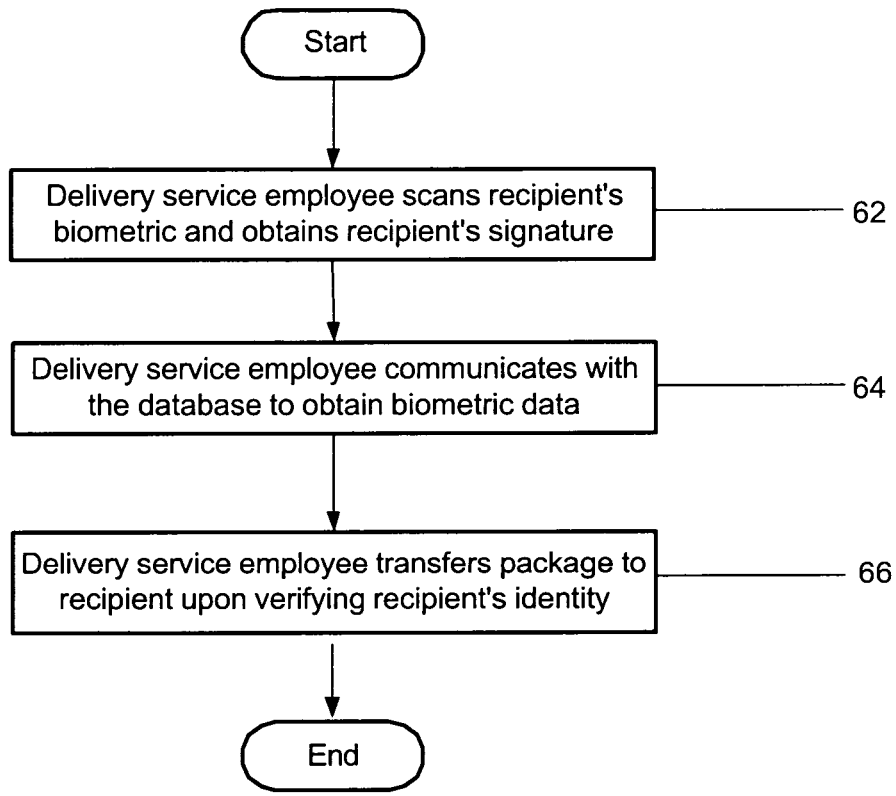
FIG. 6 shows a flow chart illustrating an exemplary embodiment of a method for verifying the recipient's identity according to the present invention.

FIG. 6 shows an exemplary method for verifying the identity of the recipient 6 without using the card 20. In step 62, the delivery service 4 reads the fingerprint 24 of an intended representative using the reader 38 in a substantially similar manner as described in step 54. In step 64, the device 30 contacts the database 5 to determine if the intended representative is one of the authorized representatives of the recipients 6. If the intended representative is the authorized representative who may receive the package, then the device 30 searches the database 5 for a corresponding biometric identifier. To expedite the search, an additional information about the intended representation may be utilized (e.g., a name, a social security number, etc.). In step 66, the device 30 compares the fingerprint obtained in step 64 to the fingerprint 24 obtained from the database 5 in step 62. If the fingerprints match, then the intended representative is authorized to receive the package.

One of the advantages of this exemplary method is that the authorized representative does not have to carry the card 20, and thus, the registration process with the delivery service 4 may be significantly shorter. In addition, there is no risk of the card 20 being used by an unauthorized person. One of the advantages of the method which utilized the card 20 is that while it requires a longer registration period it provides an additional layer of security. In particular, the authorized representative has to show the card 20 prior to any subsequent steps of the verification procedure.

Another advantage of the present invention is that it provides additional security to the delivery services 4. Presently, the package delivery system is incapable of verifying that a person who received the package was in fact the authorized representative of the recipient 6.

Figure 1B:
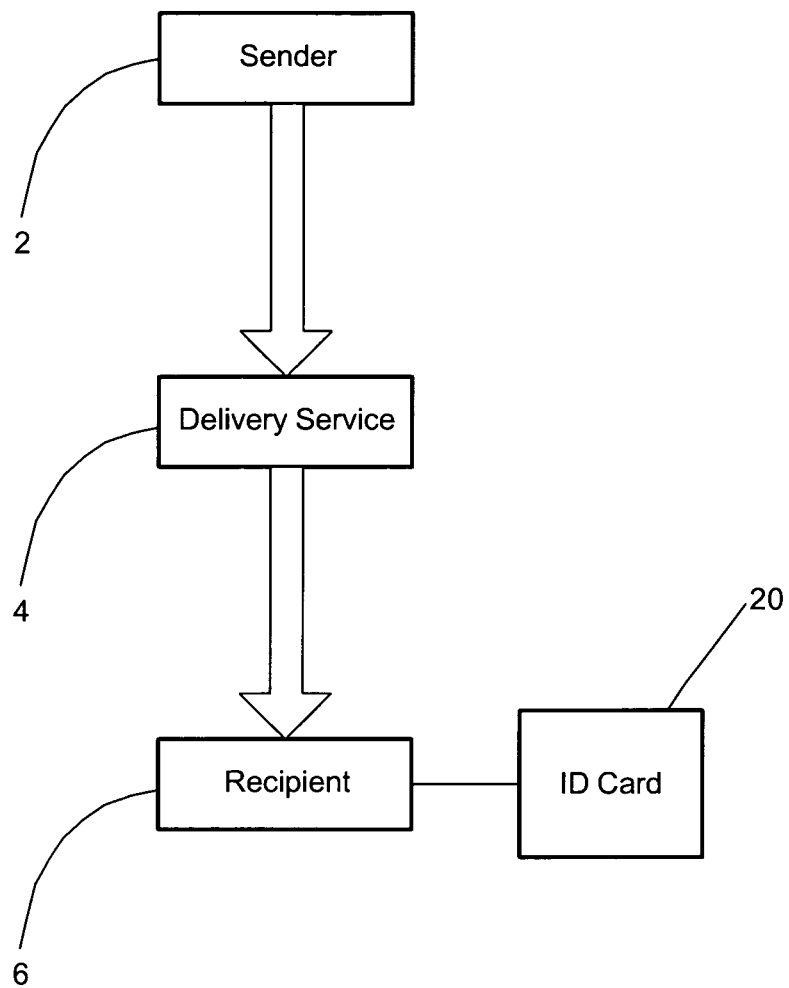
FIG. 1b shows an exemplary system for providing a verified delivery of a package according to the present invention.

FIG. 1b shows an alternative system for providing a verified delivery of a package according to the present invention. In particular, this exemplary system has no database 5. Instead, the biometric data of the recipient 2 is stored only on the card 20. The card 20 may have a plurality of security features to prevent any alterations. For example, the data stored on the card 20 may be encrypted using a public-private encryption system (e.g., PGP). In addition, the access to the data stored on the card 20 may be password-protected. Once the card 20 is generated, it is transferred into the possession of the recipient 2.

When the package is delivered by the delivery service 4 to the recipient 2, the biometric data is obtained from the recipient 2 using the device 30. Then, the biometric data is obtained from the card 20, e.g., by scanning the barcode. In addition, the device 30 checks if the data stored on the card 20 was alerted in any way using predetermined security features. Furthermore, in the alternative exemplary embodiment, the agent of the delivery server 4 and/or the recipient 2 must enter corresponding passwords/keys in order for the device 30 to access and/or decrypt the biometric data stored on the card 20.

The biometric data obtained directly from the recipient 2 and the card 20 are compared. If the data are substantially similar, the package is released to the recipient 2. Once this transaction is completed, the device 30 may retain only a record of the completed transaction and the biometric data is erased from the device 30. The record of the completed transaction may be utilized for an electronic delivery confirmation.

One of the advantages of this alternatively exemplary embodiment is absence of the database 5. This allows to simplify the verification process since there is no need of additional efforts/resources for collection, storage and access to the data. In addition, there are no privacy concerns with regard to this data.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

The invention claimed is:

1. A method for providing verified delivery of an item, comprising:
    registering a recipient prior to receiving an item, the registration comprising obtaining biometric identification data from the recipient, storing the biometric identification data in a database, and issuing an identification card to the recipient comprising the biometric identification data and a signature sample from the recipient;
    scanning a barcode of the issued card at a point of delivery using a barcode scanner of a portable device, the barcode comprising the biometric identification data;
    obtaining biometric information from the recipient upon delivery of the item using a biometric scanner of the portable device;
    comparing the biometric identification data obtained from the card and the biometric information obtained from the biometric scanner to the biometric information stored in the database;
    obtaining a signature from the recipient upon delivery of the item using a signature pad of the portable device;
    comparing the signature sample obtained from the card and the signature obtained from the recipient; and
    releasing the item to the recipient based on the comparison of the biometric information and the signature.

2. The method according to claim 1, further comprising:
    storing the biometric identification data in a remote database wirelessly accessible by the portable device.

3. The method according to claim 1, wherein the point of delivery is an address of the recipient.

4. The method according to claim 1, wherein the biometric identification data includes at least one of a fingerprint, a retinal scan, a voice sample and a DNA sample.

5. A portable electronic device for verifying delivery of an item, comprising:
    a communications arrangement having access to a recipient verification record for a recipient of the item, the recipient verification record including biometric identification data stored in a database;
    a barcode scanner scanning a barcode included on an identification card presented by the recipient at a point of delivery using the portable device, the barcode comprising a copy of the biometric identification data stored in the database, the identification card further comprising a signature sample from the recipient; and
    a processor comparing the copy of the biometric identification data and the biometric identification data stored in the database and the signature sample obtained from the card and a signature obtained from the recipient to verify an identity of the recipient.

6. The device according to claim 5, further comprising:
    a display screen,
    wherein, the processor generates a visual indicator on the display screen as a function of the comparison of the biometric identification data and signature, the visual indicator indicating whether to release the item to the recipient.

7. The device according to claim 5, further comprising: a signature pad.

8. The device according to claim 5, further comprising: a biometric reader.

9. The device according to claim 5, wherein the communications arrangement is a wireless communications arrangement.

10. The device according to claim 9, wherein the wireless communications arrangement wirelessly accesses a remote database storing the record.

11. The device according to claim 10, wherein the point of delivery is an address of the recipient.

12. The device according to claim 5, wherein the biometric identification data includes at least one of a fingerprint, a retinal scan, a voice sample and a DNA sample.

* * * * *